United States Patent [19]

Watson

[11] Patent Number: 4,636,792

[45] Date of Patent: Jan. 13, 1987

[54] CAPACITIVE ANGULAR POSITION TRANSDUCER

[75] Inventor: Christopher A. Watson, Upland, Calif.

[73] Assignee: ITT Corporation, New York, N.Y.

[21] Appl. No.: 626,803

[22] Filed: Jul. 2, 1984

[51] Int. Cl.$^4$ ............................................. G08C 19/10
[52] U.S. Cl. ............................. 340/870.37; 33/1 PT
[58] Field of Search ................... 340/870.37; 361/300, 361/280, 292, 298, 299; 33/1 N, 1 PT

[56] References Cited

U.S. PATENT DOCUMENTS

| | | | |
|---|---|---|---|
| 2,111,442 | 3/1938 | West, Jr. | 340/870.37 X |
| 3,668,672 | 6/1972 | Parnell | 340/870.37 |
| 4,414,634 | 11/1983 | Louis et al. | 364/510 |
| 4,558,320 | 12/1985 | Pedrazza | 340/870.37 X |

OTHER PUBLICATIONS

Jani, M. A. et al., Capacitance to Time-Period ... Multivibrator, IEEE Transactions, vol. IECI-22, No. 3, Aug. '75, pp. 430–432.
Acco Bristol Product Data Sheet B 205.1-4, 1968.

*Primary Examiner*—Jerry W. Myracle
*Attorney, Agent, or Firm*—T. L. Peterson; R. C. Turner

[57] ABSTRACT

A transducer for sensing the angular position of a shaft over a limited angle (e.g., ±30°) uses a printed circuit board mounted perpendicular to the shaft between capacitor plates of a bifurcated vane clamped to the shaft. The board has two pairs of symmetrical capacitor plates, one pair on each side with each plate of a pair located symmetrically with respect to the midposition of the vane plates, and corresponding plates of each pair connected together at a junction to place the two corresponding variable capacitors in parallel. Circuitry produces a Mark-Space signal proportional to the position of the bifurcated vane. Using the total Mark-Space period to continually derive a midposition reference, and comparing that midposition reference to any deviation of equal Mark and Space periods provides a position signal proportional to deviation from midposition of the bifurcated vane. By offsetting the midposition reference signal, the position output signal will be proportional to the position of the plates of the bifurcated vane with respect to the circuit board plates from one extreme to the other.

14 Claims, 8 Drawing Figures

000
CAPACITIVE ANGULAR POSITION TRANSDUCER

BACKGROUND OF THE INVENTION

This invention relates to an angular position transducer, and more particularly to a capacitive angular position transducer.

In many applications, the angular position of a shaft must be sensed over a limited range, for example 60° or ±30°, to produce a proportional analog signal. This is sometimes required as a position feedback signal to a servomechanism turning the shaft, or simply to provide an electrical output signal proportional to the position of a shaft which may be used, for example, on a chart recorder. It is sometimes important that the transducer not provide additional mechanical load, such as may occur due to friction in the case of a potentiometer being used for that purpose. It is also sometimes important that the transducer operate over a significant temperature range, for example −20° to +180° F., and that axial motion of the shaft not affect the performance of the transducer.

SUMMARY OF THE INVENTION

In accordance with the present invention, a printed circuit board is mounted perpendicular to a shaft, and a capacitor vane, preferably bifurcated, is clamped to the shaft, or vice versa. The capacitor vane embraces both sides of the printed circuit board on which are two pairs of symmetrical capacitor plates, one pair on each side, with the pair on one side directly opposite the pair on the other side. The corresponding (opposite) plates are connected together at a junction on the board, thereby to connect in parallel the variable capacitor formed by each with the plates of the bifurcated vane. As the vane is pivoted on the axis of the shaft, or vice versa, the capacitance value of one pair of plates will increase while the capacitance value of the other pair will decrease. Because the capacitance value of each pair is the sum of the capacitance between the vane and each plate of the pair, any axial movement of the shaft that affects the spacing between the vane and the pair of plates has only a negligible effect on that sum.

The junction of each of the two pairs of plates is connected to circuit means on the printed circuit board for controlling the ration of Mark and Space periods of a periodic squarewave in proportion to the ratio of the capacitances of the two pairs, and converting the squarewave into a dc signal which is proportional to that ratio, and therefore proportional to the angular position of the shaft which positions the capacitor vane.

The circuit means may also include further means for dividing the frequency of the Mark-Space signal by two, thus producing a symmetrical squarewave output signal. Upon converting that output signal to a dc signal proportional to its Mark-Space ratio, a reference signal is produced that is proportional to the midposition of the vane. By differencing the actual position dc signal with this midposition signal, a signal equal to the difference is obtained that is proportional to the deviation. Upon adding a dc offset, the final output signal will vary from zero to a maximum as the shaft rotates the vane from one extreme position to another.

The novel features of the invention are set forth with particularlity in the appended claims. The invention will best be understood from the following description when read in conjunction with the drawings.

DESCRIPTION OF PREFERRED EMBODIMENTS

Figure 1:
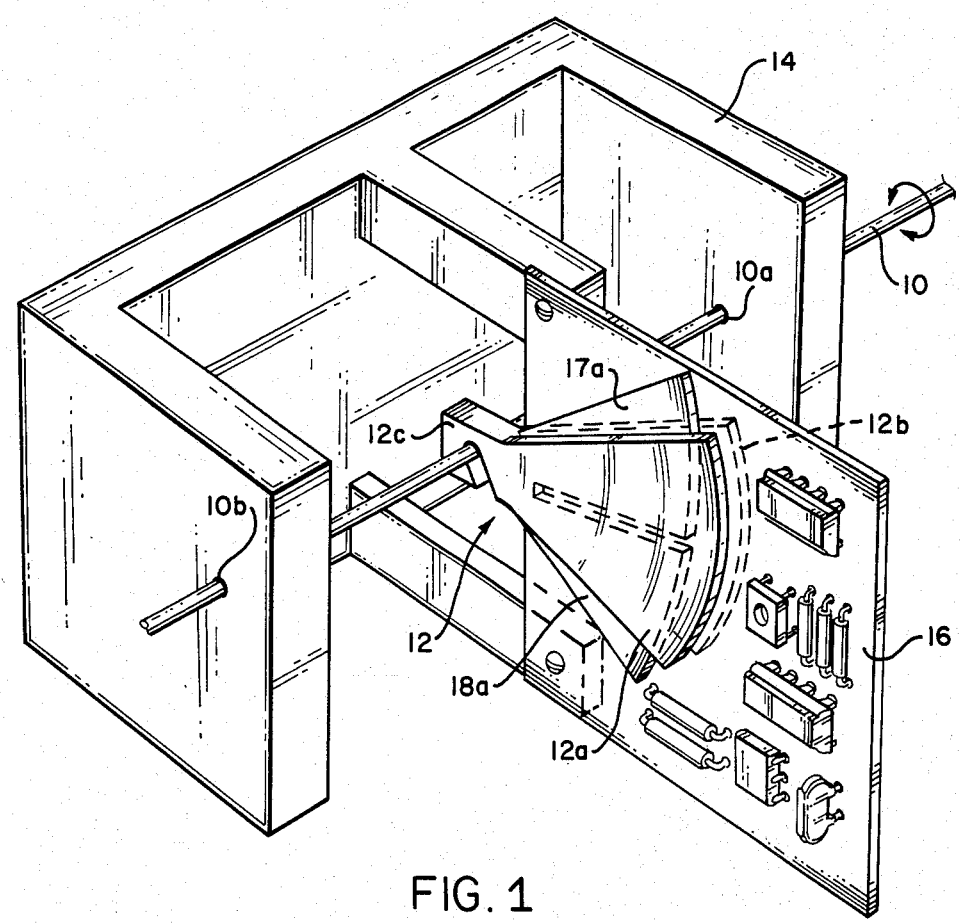
FIG. 1 is an isometric view of shaft position transducer which utilizes a bifurcated vane with two pairs of capacitor plates on a printed circuit board, one pair on each side, with the plates of a pair directly opposite each other connected through the circuit board that is standing between the two sides of the bifurcated vane according to the present invention.

In the embodiment of FIG. 1, there is shown a transducer for producing a signal proportional to the angular position of a shaft 10 comprised of a vane 12 which is preferably bifurcated into plates 12a and 12b, and a base 12c.

This bufurcation is desirable because it increases the capacitances of the transducer. If this increased capacitance is not needed, the vane need not be bifurcated.

Figure 2B:
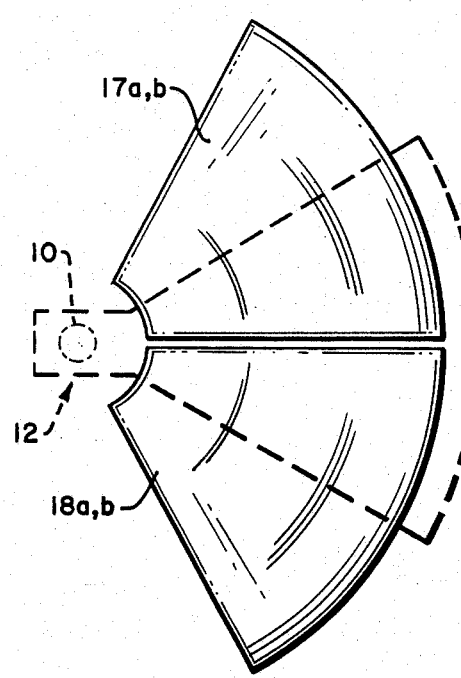
FIGS. 2a and 2b are front and side elevation, and 2c is a block diagram.
Figure 2A:
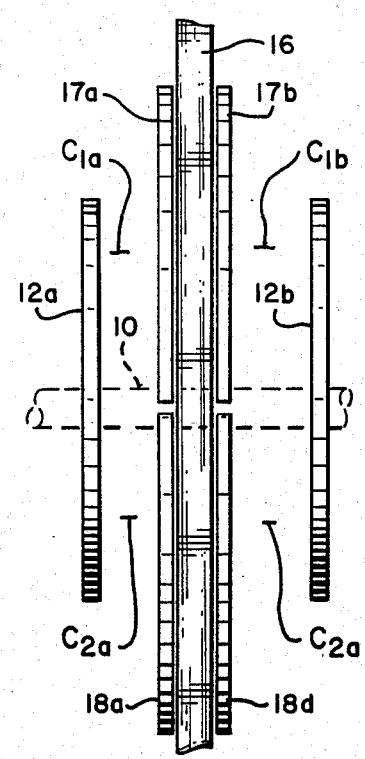
Figure 3:
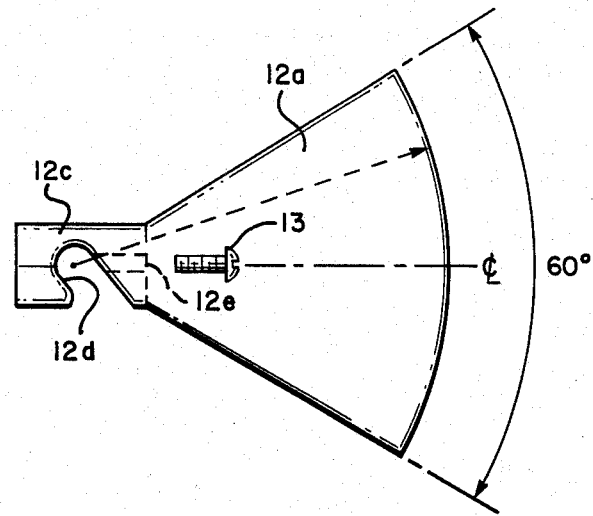
FIG. 3 is a side elevation of the bifurcated vane.
Figure 4:
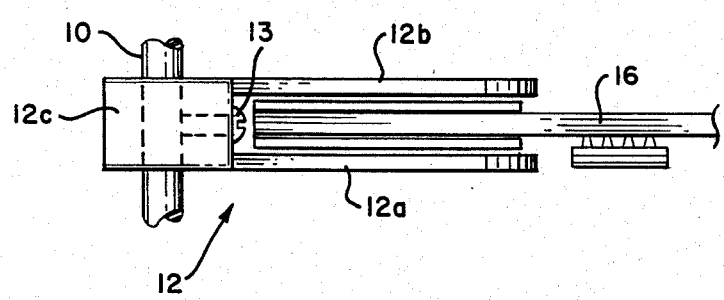
FIG. 4 is a plan view of the bifurcated vane with the printed circuit board positioned between the sides of the bifurcated vane.

The vane is locked on the shaft by a screw 13 shown in FIGS. 3 and 4 so that it will turn with the shaft over the desired angle in either direction. The shaft 10 has journals 10a and 10b in an E-shaped bracket 14 for support in space relative to a printed circuit board 16 on which capacitor plates 17a and 18a are provided on one side of the board 16. Identical and directly opposed capacitor plates 17b and 18b are provided on the other side of the board as shown in FIG. 2a. A plan view shown in FIG. 2b shows the shape of the plates 17a, b, and 18a, b, relative to the bifurcated vane 12.

As the shaft 10 moves in angular position, the vane moves from the midposition shown in FIG. 2b in either direction over the capacitor plates 17a, b and 18a, b. This changes the relative capacitance of the vane with the plates 17a, b and 18a, b. Circuit means on the board 16 transforms this change in capacitance into a change in a dc position signal which may be used, for example, on a chart recorder.

Figure 2C:
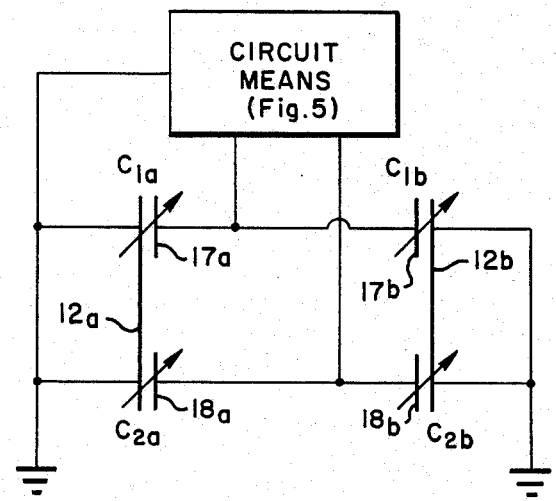
FIG. 2 is a plan view of one capacitor plate of each pair on one side of the printed circuit board, with the position of the bifurcated vane shown in phantom lines.

Two pairs of capacitor plates 17a, b and 18a, b are used with the bifurcated vane in order that change in the axial position of the shaft will not cause any change in the angular position signal. This results in having four variable capacitors electrically connected as shown schematically in FIG. 2c. The capacitors $C_{1a}$ and $C_{1b}$ are always equal to a value that depends on angular position, except to the extent that the spacing $S_1$ and $S_2$ may be unequal due to axial motion of the shaft 10. But since the space $S_1$ decreases as the space $S_2$ increases, and vice versa, to increase and decrease the respective capacitors $C_{1a}$ and $C_{1b}$, the capacitance $C_{1a}$ may not always remain equal to the capacitance $C_{1b}$. However, their ratio will always remain the same. The same applies to the other pair of capacitor plates 18a and 18b.

The vane 12, having plates 12a and 12b forming the variable capacitors $C_{1a}$, $C_{1b}$ and $C_{2a}$, $C_{2b}$, is grounded through the shaft, which in turn is electrically connected to the bracket 14. The board 16 is also referenced to the same circuit ground by connection of a ground conductor on the board to the bracket which supports it, as indicated schematically in FIG. 2c.

FIG. 3 illustrates the bifurcated vane in elevation. A slot 12d cut at an acute angle with respect to the axis of the base 12c receives the shaft. To lock the bifurcated vane on the shaft so that it will turn with the shaft, a set screw 13 is used in a threaded hole 12e to press the shaft firmly against the back of the slot 12d.

FIG. 4 is a top view of the bifurcated vane. Shown between the plates 12a and 12b is the printed circuit board 16 with the capacitor plates on opposite sides. The spacings $S_1$ and $S_2$ shown exaggerated in FIG. 2a are shown here more realistically.

Figure 5:
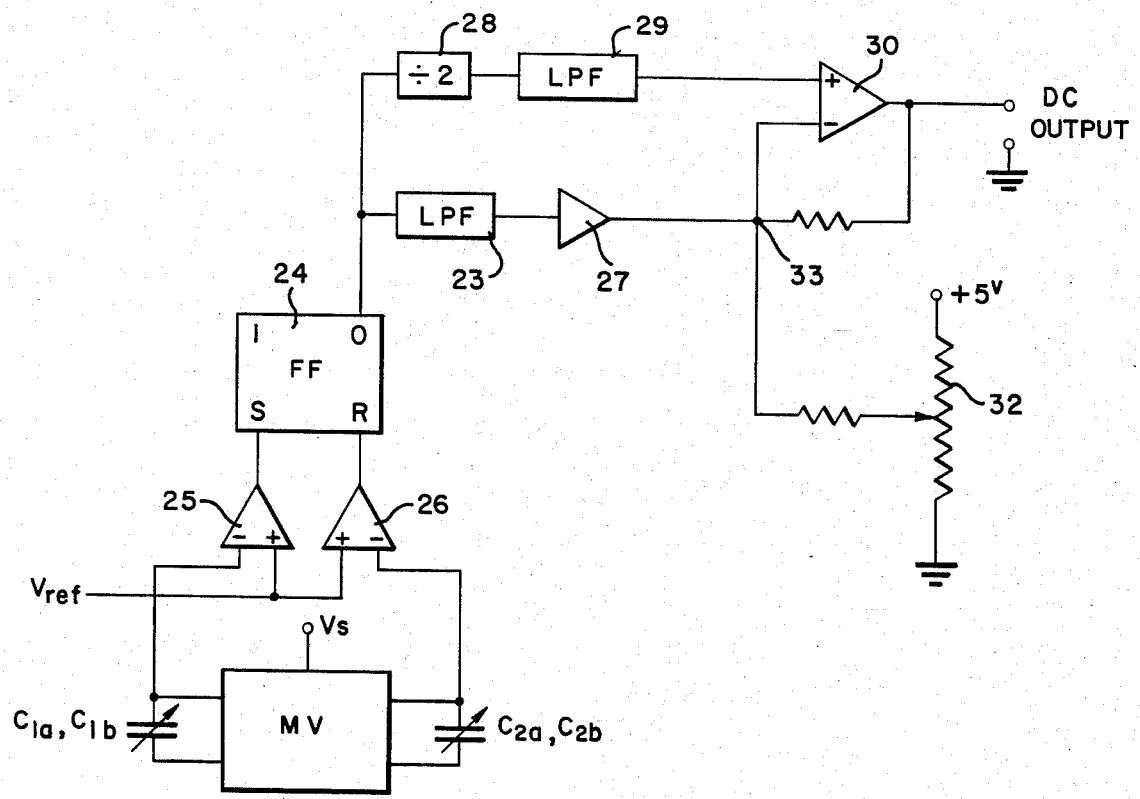
FIG. 5 is a diagram of the circuit means used to convert the vane position over the pairs of capacitors to provide a signal proportioned to shaft position.
Figure 6:
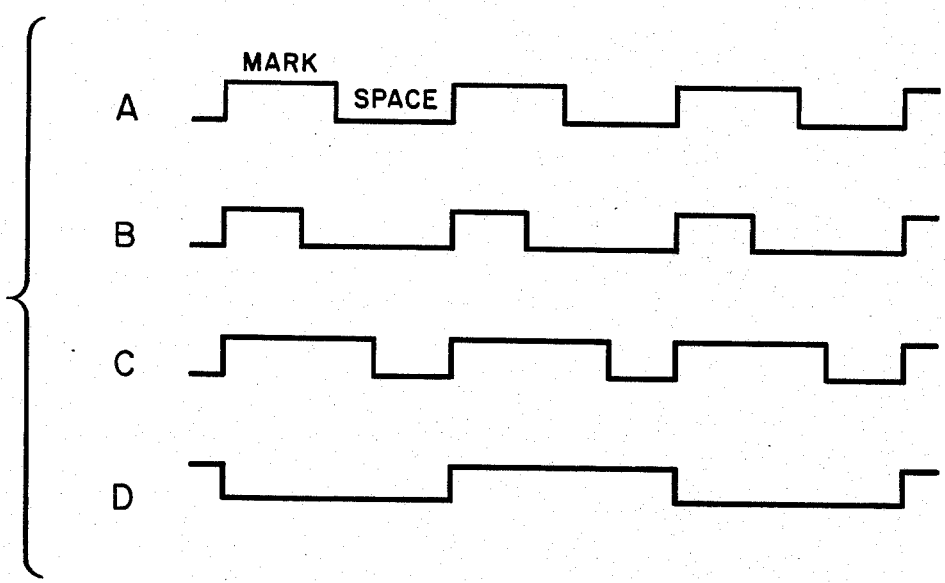
FIG. 6 is a waveform diagram useful in understanding the invention.

Referring now to FIG. 5, the circuit on the board 16 is comprised of a relaxation oscillator 21, such as of the type commonly referred to as an astable multivibrator (MV), with two timing capacitors, which may be of the type more commonly known as multivibrators (MV). These oscillators utilize the parallel connected variable capacitors $C_{1a}$, $C_{1b}$ and $C_{2a}$, $C_{2b}$ for RC timing of Mark-Space periods of a square waveform shown in FIG. 6. When the two pairs of parallel connected capacitors are of equal capacitance, the square waveform is symmetrical, as shown in waveform A of FIG. 6. If they become unequal in one direction, the Space period increases, and the Mark period decreases by the same amount, as shown in waveform B. If they become unequal in the opposite direction, the Space period decreases, and the Mark period increases by the same amount, as shown in waveform C. If this square waveform of variable Mark-Space periods is passed through a low-pass filter 23, it is apparent that the change in the average dc level of the signal will be proportional to the change in position of the vane 12 from its midposition.

The Mark and Space periods of the square waveform are produced in the following way. Assume that the bifurcated vane 12 is in the midposition, and the power supply to the circuit of FIG. 5 has been turned on for some time. When the RC timing circuit on the left of the relaxation oscillator 21 times out, it shifts to the other state and sets a flip-flop 24 via a threshold detector 25 to initiate a Mark period. When its RC timing circuit on the right times out, it shifts the multivibrator 21 back to its first state and resets the flip-flop 24 through a threshold detector 26 to initiate a Space period. If the vane changes angular position clockwise in FIG. 1 from the midposition, so as to decrease the capacitors $C_{1a}$ and $C_{1b}$, the Space period decreases and the Mark space increases, but the total Mark-Space waveform period remains the same.

The Mark-Space square waveform output is fed to the low-pass filter 23 amd a noninverting amplifier 27, and also to a divide-by-two circuit (D-type flip-flop) 28 that triggers on the leading edge of the Space period (or Mark period, whichever is chosen). This produces a symmetrical square waveform regardless of any difference in the Mark and Space periods, as shown by waveform D in FIG. 6. A low-pass filter 29 provides a signal, the average dc level of which will be proportional to the vane midposition. The difference between the output signals of the low-pass filters 23 and 29, computed by an operational amplifier 30 connected to amplify that difference, is then proportional to the deviation of the vane position from its midposition. A potentiometer 32 is connected to the summing junction of the operational amplifier 30 (connected as a differencing amplifier) to add a dc offset signal that will shift the output of the amplifier 30 to provide zero volts at one extreme position and a maximum dc voltage level at the other extreme position.

The symmetry of the circuit, which includes capacitors $C_{1a}$, $C_{1b}$ and $C_{2a}$, $C_{2b}$, and the fact that the ratio, and not their absolute value, is important, means that most interfering parameters cancel out. The frequency of the squarewave is not important.

Although particular embodiments of the invention have been described and illustrated herein, it is recognized that modifications and variations may readily occur to those skilled in the art. For example, in the event that the absolute dc average is desired, rather than the change in the dc output with respect to a change in vane position, it would be possible to disconnect the offset voltage potentiometer and the amplifier 30. The output voltage at the junction 33 is then given by the equation $V_{out} = V_s(C_1/C_1 + C_2)$, where $V_s$ is the power supply voltage and $C_1$ and $C_2$ are the paired capacitors $C_{1a}$ and $C_{1b}$ and $C_{2a}$ and $C_{2b}$, and if the same output signal is desired with an offset, the offset potentiometer 32 could be reconnected. Since the primary purpose for having the paired capacitor plates is to increase the capacitance, it is evident that even greater capacitance may be achieved by using a bifurcated vane and plates on a circuit board to the rear of the arrangement shown. In fact, four bifurcated vanes could be provided on the same base 12c, each with its own paired plates on a circuit board. Consequently, it is intended that the claims be interpreted to cover such modifications and variations.

What is claimed is:

1. A capacitive transducer for sensing the angular position of a shaft within a limited angle on each side of a midposition comprising
   a vane having a capacitor clamped perpendicular to said shaft and disposed symmetrically with respect to said midposition,
   a printed circuit board mounted perpendicular to the axis of said shaft adjacent to said capacitor plate of said vane, said printed circuit board having
   a first capacitor plate and a second capacitor plate positioned on said printed circuit board and disposed symmetrically with respect to said midposition, and
   circuit means on said circuit board, having its circuit ground conductor connected to said vane capacitor plate for producing a position signal proportional to the capacitance of said vane capacitor plate over said plate on said circuit board.

2. A capacitive transducer as defined in claim 1 wherein said circuit means is comprised of
   a relaxation oscillator connected to one of said corresponding capacitor plates on said circuit board for timing the Mark and Space periods of a squarewave signal output of said relaxation oscillator proportional to the values of said one and said second capacitors,
   a bistable multivibrator connected to be triggered to one state by the output of said relaxation oscillator at the end of its Mark period, and connected to be triggered to the other state by the output of said relaxation oscillator at the end of its Space period, whereby a squarewave Mark-Space signal is derived from said bistable multivibrator in which the ration of Mark to Space periods is a measurement of deviation of said vane plate from said midposition.

3. A capacitive transducer as defined in claim 2 including
a first means for converting said Mark-Space waveform signal to a first dc signal proportional to said ratio,
a divide-by-two circuit means responsive to said Mark-Space signal for producing a symmetrical square waveform,
a second means for converting said symmetrical square waveform to a second dc signal, and
means for obtaining a difference dc signal between said first and second dc signals as a measurement of deviation of said vane plate from said midposition.

4. A capacitive transducer as defined in claim 3 including a source of offset voltage of sufficient value to make said difference dc signal a minimum when said vane plate is at one extreme position and a maximum when said vane plate is at the other extreme position, and means for adding said offset signal to said difference signal.

5. A transducer for sensing the angular position of a shaft over a limited angle comprising a vane having a capacitor plate and a printed circuit board, one of said vane and circuit boards being clamped to said shaft for pivotal motion relative to the other as said shaft rotates over said limited angle, said printed circuit board being located perpendicular to said shaft and parallel to said vane plate, circuit means for producing a Mark-Space position signal with the ratio of the Mark period to the Space period proportional to the position of the vane plate with respect to said capacitor plate on said circuit board, means responsive to the total Mark-Space period for deriving a reference signal, and means for comparing said reference signal to any deviation of equal Mark and Space periods to provide a position signal proportional to deviation from midposition of the vane plate relative to the circuit board plate.

6. A transducer as defined in claim 5 including means for converting each of said reference and said Mark-Space signals to an average dc signal, and means for offsetting said dc reference signal by half the total possible deviation of said dc position signal for the limited angular position of said shaft, whereby said dc position signal will be proportional to said shaft position from one extreme to the other.

7. A capacitive transducer for sensing the angular position of a shaft within a limited angle on each side of a midposition comprising
a bifurcated vane having two identical capacitor plates, said vane being clamped perpendicular to said shaft,
a printed circuit board mounted perpendicular to the axis of said shaft and between said two plates of said bifurcated vane, said printed circuit board having
two pairs of opposing capacitor plates of the same shape, one pair on each side, and the two capacitor plates of each pair positioned on opposite sides of an adjacent to said capacitor vane, with corresponding capacitor plates opposing each other on said board being connected to each other at a junction, and circuit means on said circuit board, having its circuit ground conductor connected to said vane plates, for producing a position signal proportional to the ratio of capacitance of said vane plates over one opposing set of said plates on said circuit board connected to said junction between them to the capacitance of said vane plates over the other set of opposing plates on said circuit board connected to said junction between them.

8. A capacitive transducer as defined in claim 7 wherein said bifurcated vane plates are symmetrical about a centerline intersecting the axis of said shaft, and said two pairs of opposing capacitor plates on said circuit board are symmetrical about the centerline of said bifurcated vane when said shaft is in a midposition.

9. A capacitive transducer as defined in claim 8 wherein said circuit means is comprised of
a relaxation oscillator connected to said junction between one set of corresponding capacitor plates and the other set of corresponding capacitor plates for timing the Mark and Space times of said oscillator,
a bistable multivibrator connected to be triggered to one state by the output of said relaxation oscillator at the end of its active period, and connected to be triggered to the other state by the output of said relaxation oscillator at the end of its inactive period, whereby a Mark-Space signal is derived from said bistable multivibrator in which the ratio of Mark to Space periods is a measurement of deviation of said bifurcated vane from said midposition.

10. A capacitive transducer as defined in claim 9 including
a first means for converting said Mark-Space waveform signal to a first dc signal proportional to said ratio,
a divide-by-two circuit means responsive to said Mark-Space signal for producing a symmetrical square waveform,
a second means for converting said symmetrical square waveform to a second dc signal, and
means for obtaining a difference dc signal between said first and second dc signals as a measurement of deviation of said bifurcated vane from said midposition.

11. A capacitive transducer as defined in claim 10 including a source of offset voltage of sufficient value to make said difference dc signal a minimum when said bifurcated vane plates are at one extreme position and a maximum when said bifurcated vane plates are at the other extreme position, and means for adding said offset signal to said difference signal.

12. A transducer for sensing the angular position of a shaft over a limited angle comprising a bifurcated capacitor vane having two plates clamped to said shaft and a printed circuit board mounted perpendicular to said shaft between said bifurcated capacitor vane plates, said board having two pairs of symmetrical capacitor plates, one pair on each side with each plate of a pair placed adjacent a center line which corresponds to the midposition of said vane plates, and corresponding plates of each pair connected together at a junction to place the two corresponding variable capacitors in parallel, and circuit means for producing a Mark-Space position signal with the ratio of the Mark period to the Space period proportional to the position of the bifurcated vane plates with respect to the two pairs of plates on said circuit board.

13. A transducer as defined in claim 12 including means responsive to the total Mark-Space period for deriving a midposition reference signal, and comparing said reference signal to said Mark-Space signal to provide a position signal proportional to deviation from midposition of the bifurcated vane relative to the two pairs of plates on said circuit boards.

14. A transducer as defined in claim 13 including means for converting each of said reference and said Mark-Space signals to an average dc signal, and means for offsetting said dc reference signal by half the total possible deviation of said dc position signal for the limited angular position of said shaft, whereby said dc position signal will be proportional to said shaft position from one extreme to the other.

* * * * *